(12) United States Patent
Tyler et al.

(10) Patent No.: US 10,814,569 B2
(45) Date of Patent: Oct. 27, 2020

(54) METHOD AND MATERIAL FOR ADDITIVE MANUFACTURING

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 97 days.

(21) Appl. No.: 15/982,292

(22) Filed: May 17, 2018

(65) Prior Publication Data

US 2019/0001590 A1    Jan. 3, 2019

Related U.S. Application Data

(60) Provisional application No. 62/611,922, filed on Dec. 29, 2017, provisional application No. 62/526,448, filed on Jun. 29, 2017.

(51) Int. Cl.
*B29C 70/38* (2006.01)
*B29C 64/209* (2017.01)
(Continued)

(52) U.S. Cl.
CPC .......... *B29C 70/384* (2013.01); *B29B 15/122* (2013.01); *B29B 15/14* (2013.01);
(Continued)

(58) Field of Classification Search
CPC .......... Y10T 428/249971; Y10T 428/249994; Y10T 428/249995; Y10T 428/249997; C22C 49/14; C08K 7/02; C08J 3/241; B82Y 30/00; B32B 17/04; B32B 17/10963; B32B 2307/762; B29C 73/163; B29C 73/22; B29C 70/10; C04B 20/0056; C04B 22/006; C04B 28/0003; C04B 40/0641; C04B 40/0263
(Continued)

(56) References Cited

U.S. PATENT DOCUMENTS 3,286,305 A    11/1966 Seckel
3,809,514 A    5/1974 Nunez
(Continued)

FOREIGN PATENT DOCUMENTS

DE    4102257 A1    7/1992
EP    2589481 B1    1/2016
(Continued)

OTHER PUBLICATIONS

International Search Report dated Sep. 25, 2018 for PCT/US18/33327 to CC3D LLC Filed May 18, 2018.
(Continued)

*Primary Examiner* — Camie S Thompson
(74) *Attorney, Agent, or Firm* — Ryan C. Stockett

(57) ABSTRACT

A structure is disclosed that is additively manufactured. The structure may include at least one continuous reinforcement, and a healing matrix associated with the at least one continuous reinforcement. Wherein a cure energy is applied to the at least one continuous reinforcement at a time of failure, the healing matrix is caused to cure and shore up the at least one continuous reinforcement.

19 Claims, 3 Drawing Sheets

(51) Int. Cl.

| | | |
|---|---|---|
| *B29B 15/12* | (2006.01) | |
| *B29B 15/14* | (2006.01) | |
| *B29C 64/165* | (2017.01) | |
| *B33Y 10/00* | (2015.01) | |
| *B33Y 30/00* | (2015.01) | |
| *B29C 35/08* | (2006.01) | |
| *B29C 70/06* | (2006.01) | |
| *B29K 105/08* | (2006.01) | |
| *B29K 105/00* | (2006.01) | |

(52) U.S. Cl.
 CPC ........ *B29C 35/0805* (2013.01); *B29C 64/165* (2017.08); *B29C 64/209* (2017.08); *B33Y 10/00* (2014.12); *B33Y 30/00* (2014.12); *B29C 70/06* (2013.01); *B29C 2035/0827* (2013.01); *B29K 2105/08* (2013.01); *B29K 2105/251* (2013.01)

(58) Field of Classification Search
 USPC .................. 428/313.3, 364, 36.4, 402.21
 See application file for complete search history.

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0107888 A1 | 5/2008 | Dry |
| 2008/0176092 A1 | 7/2008 | Owens |
| 2009/0095410 A1 | 4/2009 | Oldani |
| 2009/0208684 A1* | 8/2009 | Dunleavy ............... B29C 70/10 428/36.4 |
| 2010/0075134 A1 | 3/2010 | Blaiszik et al. |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2015/0159316 A1* | 6/2015 | Mao ...................... C08J 5/043 442/173 |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0200707 A1 | 7/2016 | Prez et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelnnan et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |

(56) References Cited

U.S. PATENT DOCUMENTS

| | | |
|---|---|---|
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0100902 A1 | 4/2017 | Asmatulu et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |
| WO | 2018057784 A1 | 3/2018 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXpress Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

* cited by examiner

METHOD AND MATERIAL FOR ADDITIVE MANUFACTURING

RELATED APPLICATIONS

This application is based on and claims the benefit of priority from U.S. Provisional Application Nos. 62/526,448 and 62/611,922 that were filed on Jun. 29, 2018 and Dec. 29, 2017, respectively, the contents of both of which are expressly incorporated herein by reference.

TECHNICAL FIELD

The present disclosure relates generally to additive manufacturing and, more particularly, to a method and material for additive manufacturing.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength, compared to manufacturing processes that do not utilize continuous fiber reinforcement, it may still be possible for the resulting structure to crack or break when exposed to excessive loading. The cracking or breaking may be difficult to detect, and a resulting strength of the structure may be reduced. The disclosed method and material are directed to addressing these issues and/or other problems of the prior art.

SUMMARY

In one aspect, the present disclosure is directed to an additively manufactured structure. The additively manufacture structure includes at least one continuous reinforcement, and a healing matrix associated with the at least one continuous reinforcement. Wherein a cure energy is applied to the at least one continuous reinforcement at a time of failure, the healing matrix is caused to cure and shore up the at least one continuous reinforcement.

In another aspect, the present disclosure is directed to another additively manufactured structure. The additively manufactured structure may include at least one continuous reinforcement, and a healing matrix at least partially filling the at least one continuous reinforcement. When the healing matrix may breaches from the at least one continuous reinforcement at a time of failure, the healing matrix at least partially coats the at least one continuous reinforcement and cures.

In yet another aspect, the present disclosure is directed to a method of additive manufacturing. The method may include simultaneously discharging from a print head structural reinforcements and healing reinforcements that are at least partially coated with a structural matrix. The healing reinforcements may contain a healing matrix. The method may also include directing cure energy toward the structural matrix discharging from the print head, and moving the print head during discharging to create a three-dimensional structure.

DETAILED DESCRIPTION

Figure 1:
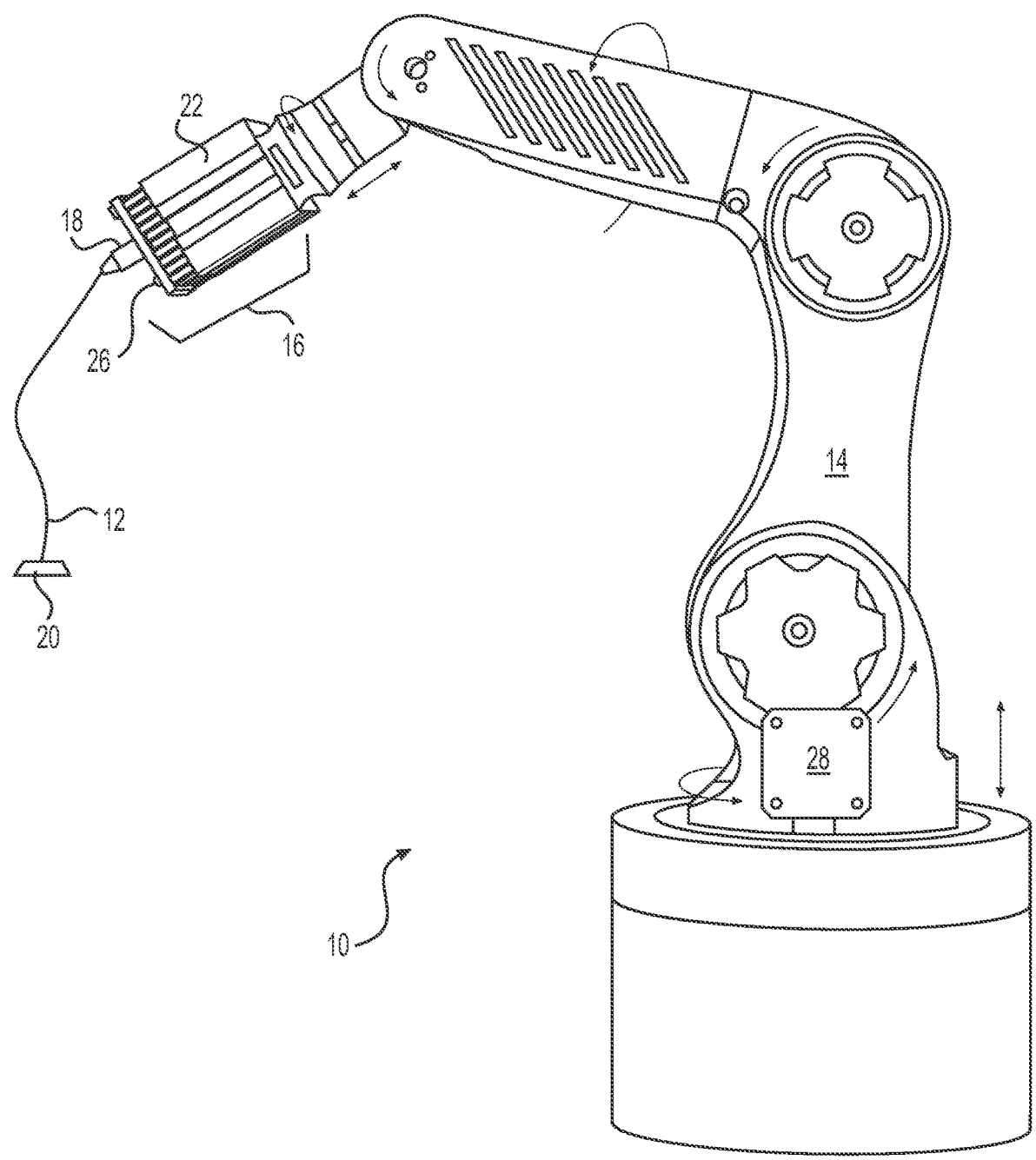
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, ellipsoidal, polygonal, etc.). System 10 may include at least a support 14 and a print head ("head") 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for similar reasons. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, hollow, solid, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from a nozzle 18 of head 16 via at least two different modes of operation. In a first mode of operation, the matrix and reinforcement are extruded (e.g., pushed under pressure and/or mechanical force) from nozzle 18, as head 16 is moved by support 14 to create the 3-dimensional shape of structure 12. In a second mode of operation, at least the reinforcement is pulled from nozzle 18, such that a tensile stress is created in the reinforcement during discharge. In this mode of operation, the matrix may cling to the reinforcement and thereby also be pulled from nozzle 18 along with the reinforcement, and/or the matrix may be discharged from nozzle 18 under pressure along with the pulled reinforcement. In the second mode of operation, where the matrix is being pulled from nozzle 18, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from nozzle 18 as a result of head 16 moving away from an anchor point 20. In particular, at the start of structure-formation, a length of matrix-impregnated reinforcement may be pulled and/or pushed from nozzle 18, deposited onto a stationary anchor point 20, and cured, such that the discharged material adheres to anchor point 20. Thereafter, head 16 may be moved away from anchor point 20, and the relative movement may cause additional reinforcement to be pulled from nozzle 18. It should be noted that the movement of the reinforcement through head 16 could be assisted (e.g., via internal feed mechanisms), if desired. However, the discharge rate of the reinforcement from nozzle 18 may primarily be the result of relative movement between head 16 and anchor point 20, such that tension is created within the reinforcement.

Nozzle 18 may be fluidly connected to a matrix reservoir 22. Although matrix reservoir 22 is shown as being at least partially inside of head 16, it should be noted that matrix reservoir 22 could alternatively be located separately upstream of head 16. Nozzle 18 may be a generally cylindrical component having an upstream or base end in communication with matrix reservoir 22, a downstream or tip end, and one or more axially oriented passages that extend from the base end to the tip end.

Any number of reinforcements (represented as R in FIG. 2) may be passed axially through reservoir 22 where at least some matrix-wetting occurs (matrix represented as M in FIGS. 2 and 3), and discharged from head 16 via nozzle 18. One or more orifices may be located at the tip end of nozzle 18 to accommodate passage of the matrix-wetted reinforcements. In the disclosed embodiment, a single generally circular orifice is utilized. It is contemplated, however, that multiple circular orifices could be used. In addition, orifices of another shape (e.g., a rectangular shape) may allow for printing of ribbons and/or sheets.

One or more cure enhancers (e.g., one or more light sources, ultrasonic emitters, lasers, heaters, catalyst dispensers, microwave generators, etc.) 26 may be mounted proximate head 16 (e.g., at a trailing side of nozzle 18) and configured to enhance a cure rate and/or quality of the matrix as it is discharged from nozzle 18. Cure enhancer 26 may be controlled to selectively expose internal and/or external surfaces of structure 12 to cure energy (e.g., light energy, electromagnetic radiation, vibrations, heat, a chemical catalyst or hardener, etc.) during the formation of structure 12. The cure energy may increase a rate of chemical reaction occurring within the matrix, sinter the material, harden the material, or otherwise cause the material to cure as it discharges from nozzle 18.

A controller 28 may be provided and communicatively coupled with support 14, head 16, and any number and type of cure enhancers 26. Controller 28 may embody a single processor or multiple processors that include a means for controlling an operation of system 10. Controller 28 may include one or more general- or special-purpose processors or microprocessors. Controller 28 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 28, including power supply circuitry, signal-conditioning circuitry, solenoid/motor driver circuitry, communication circuitry, and other appropriate circuitry. Moreover, controller 28 may be capable of communicating with other components of system 10 via wired and/or wireless transmission.

One or more maps may be stored in the memory of controller 28 and used during fabrication of structure 12. Each of these maps may include a collection of data in the form of models, lookup tables, graphs, and/or equations. In the disclosed embodiment, the maps are used by controller 28 to determine desired characteristics of cure enhancers 26, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 28 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 26, such that structure 12 is produced in a desired manner.

Figure 2:
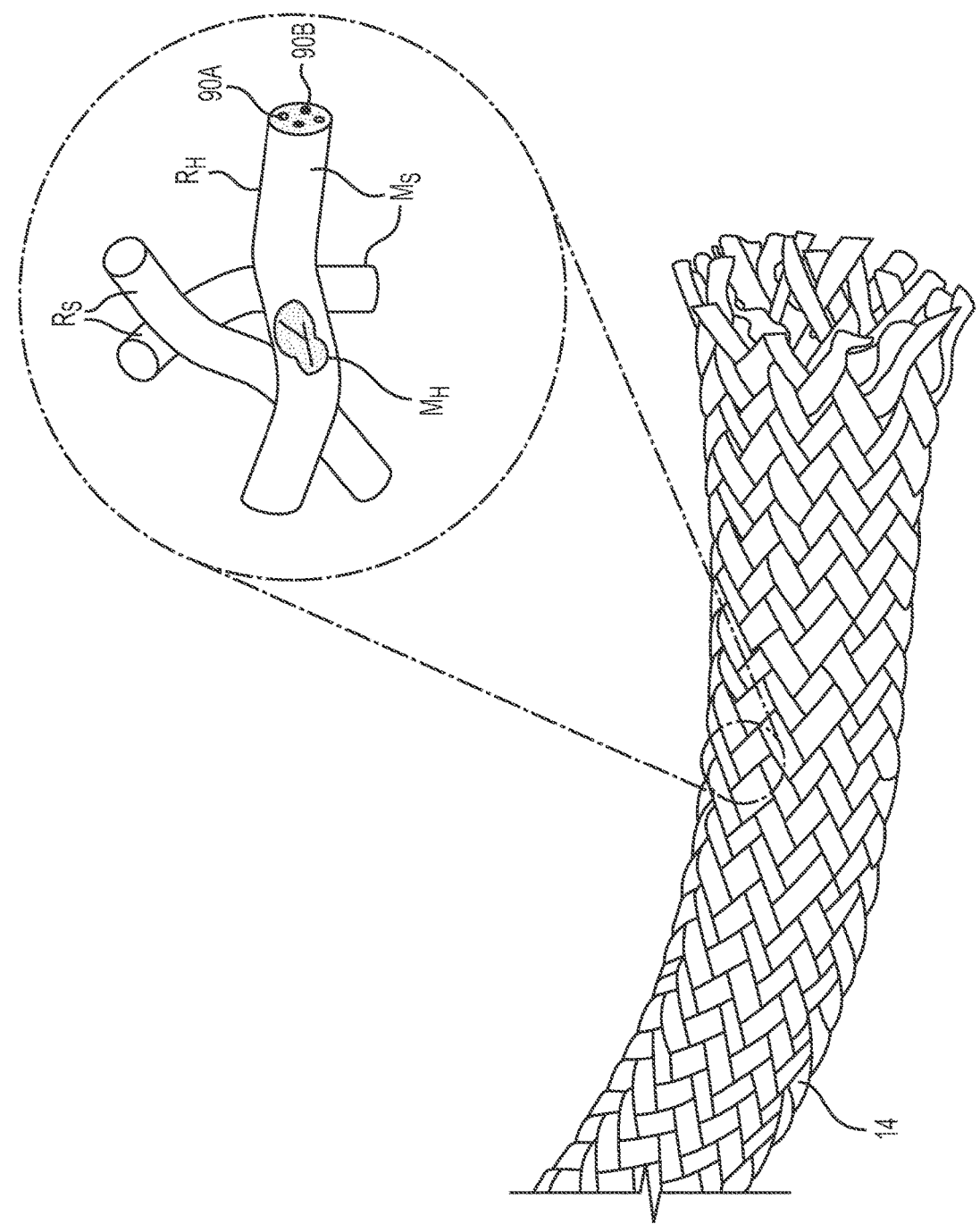
FIGS. 2 and 3 are diagrammatic illustrations of an exemplary material that may be utilized with the manufacturing system of FIG. 1.

FIG. 2 illustrates an exemplary structure 12 manufactured by system 10 to have a self-healing property. Structure 12, of this embodiment, may include multiple types of continuous reinforcements, including at least structural-type reinforcements $R_S$ and healing-type reinforcements $R_H$. Both types of reinforcements may be at least partially coated with a structural matrix $M_S$, used together, and in some embodiments, interwoven. The structural-type reinforcements $R_S$ may be generally solid and fabricated from any material having properties that contribute to a desired performance of structure 12. The healing-type reinforcements $R_H$ may be hollow, generally more brittle and/or smaller than the structural-type reinforcements $R_S$, and at least partially filled (and pressurized in some instances) with a healing matrix $M_H$. When structure 12 is exposed to extreme conditions (e.g., excessive loading, excessive cycling, temperature extremes, etc.), the healing type of reinforcements $R_H$ may crack, break, or otherwise rupture before or at the same time that mechanical damage occurs within the structural-type reinforcements $R_S$. The healing matrix $M_H$ may be curable upon breaching through the associated healing-type reinforcements $R_H$ and being exposed to the environment (e.g., to the surrounding heat, humidity, light, chemical, etc.) surrounding it. The healing matrix $M_H$ may be designed to then flow and at least partially surround or coat the reinforcements within the damaged area to shore it up and/or repair the damage.

It is contemplated that structure 12 may be fabricated to have a different amount or ratio of healing-type reinforcements $R_H$ in some areas than in other areas. For example, in an area that is known to damage/wear excessively, a tighter vascular network of healing-type reinforcements $R_H$ may be used for greater healing capabilities.

In some embodiments, the healing-type reinforcements $R_H$ may be vein-like and classified into two different types. This first type may have a base matrix stored therein, while the second type may have a catalyst or a hardener stored therein. A volume or quantity ratio of the catalyst matrix to the base matrix within structure 12 may be about (e.g., +/−10% of) 1.8 to 1.9:1. The two types of healing reinforcements $R_H$ may be deposited adjacent each other, twisted or woven together, and/or one-inside-the other.

In one embodiment, both parts of a two-part healing matrix $M_H$ may be provided separately inside of a single type of healing reinforcement $R_H$, without allowing the parts to mix. For example, the healing matrix $M_H$ may be provided in the form of capsules 90 (e.g., base matrix capsules 90A and/or catalyst or hardener capsules 90B). When exposed to the extreme conditions described above, a desired ratio of base matrix and/or hardener capsules 90 may burst at the damage location, mix, and cure in the surrounding environment. It should be noted that both parts of the matrix may be provided as capsules 90, or only one part as capsules 90 within a surrounding bath of the other part.

In another embodiment, only one of the base or catalyst components of the healing matrix $M_H$ may be located inside of the healing reinforcements $R_H$, while the other of the base or catalyst components may already be located on an outer surface of the healing reinforcements $R_H$. For example, the healing reinforcements $R_H$ may be coated with one of the components (e.g., as a pre-preg material) and also filled with the other component (as a liquid bath or as capsules).

The healing reinforcements $R_H$ may be filled and/or coated with the healing matrix $M_H$ at any time during or after the formation of structure 12. For example, the healing reinforcements $R_H$ may be pre-filled with the healing matrix $M_H$ before entering head 16 to be coated with the structural matrix $M_S$. Alternatively, the healing matrix $M_H$ may be pressurized and forced into the healing reinforcements $R_H$ at the same time that the healing reinforcements $R_H$ are passing through head 16 and being coated by the structural matrix $M_S$. Finally, it is contemplated that the hollow tubes of the healing reinforcements $R_H$ may be connected to a source (not shown) of pressurized healing matrix $M_H$ after structure 12 is formed (e.g., once to fill the healing reinforcements $R_H$ or continuously during operational use of structure 12 to maintain a desired pressure).

Figure 3:
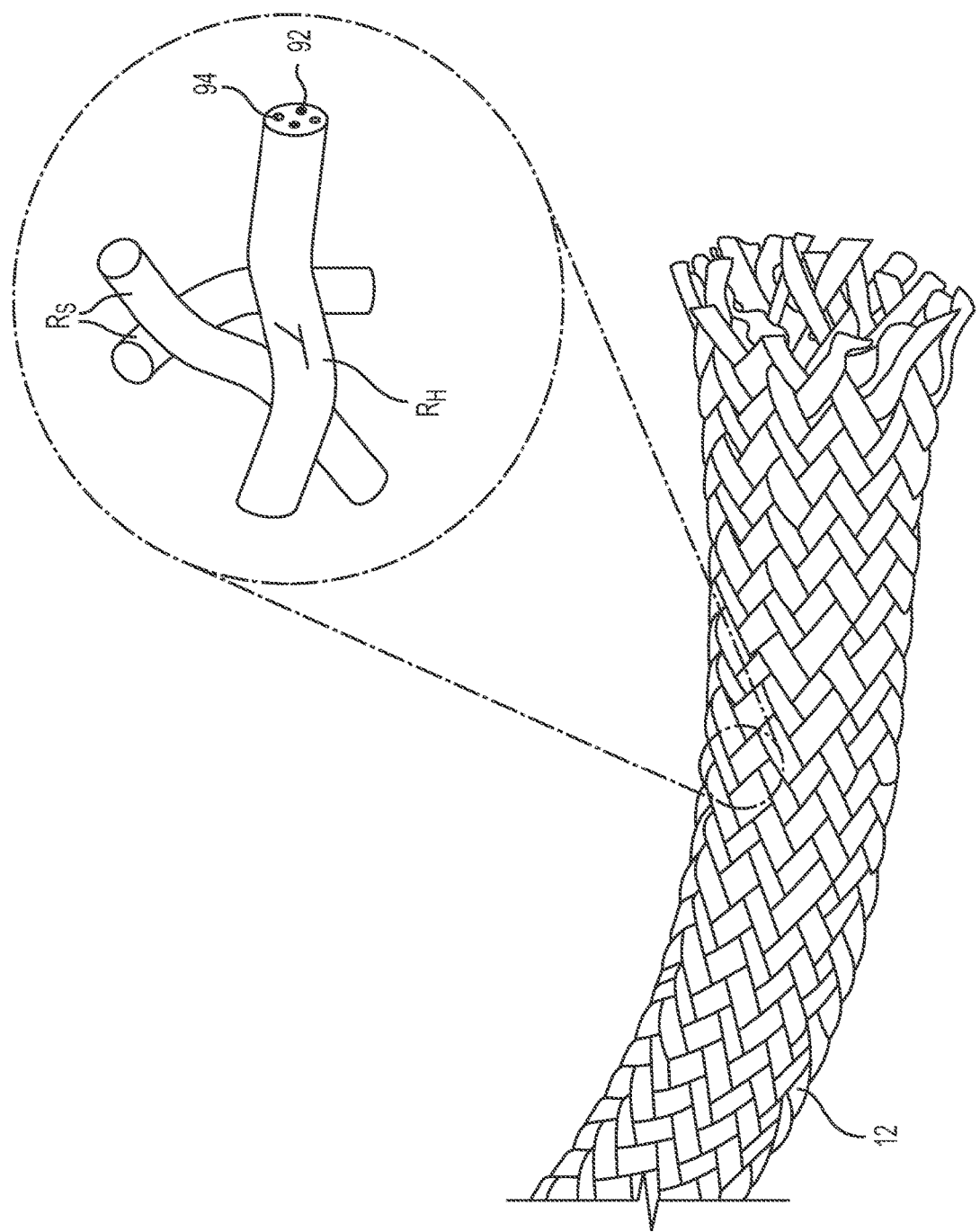

FIG. 3 illustrates another exemplary structure 12 manufactured by system 10 to have self-healing properties. Structure 12 of this embodiment may also include multiple types of continuous reinforcements, including at least structural-type reinforcements $R_S$ and healing-type reinforcements $R_H$. Both types of reinforcements may be at least partially coated with a matrix material that is capable of healing. The structural-type reinforcements $R_S$ may be solid and fabricated from any material having properties that contribute to a desired performance of structure 12. In this embodiment, the healing-type reinforcements $R_H$ may be configured to selectively activate the healing matrix material, for example after a minimum level of damage has occurred. In one embodiment, the healing-type reinforcements $R_H$ include electrodes (or another type of electrical conductors) 92 that are configured to generate heat within the healing matrix when energized. In another embodiment, the healing-type reinforcements $R_H$ include fiber optics 94 configured to conduct light into the healing matrix.

When structure 12 is exposed to extreme conditions, the healing matrix surrounding both the structure and healing types of reinforcements $R_S$, $R_H$ may begin to fail (e.g., deform, degrade, crack, etc.). This may occur before mechanical damage occurs within the structural-type reinforcements $R_S$. In some embodiments, the fiber optic of healing reinforcement $R_H$ 94 may crack, break, or otherwise rupture at the same time that the healing matrix begins to fail.

In response to the failing of the matrix material, the healing-type reinforcements $R_H$ may be selectively energized to direct heat and/or light into the surrounding healing type of matrix material. For example, in response to a detected change in resistance and/or capacitance with electrodes 92 (and/or within an electrically conductive particles or other filler placed inside the matrix) corresponding with strain, an associated structural controller may cause a current to be passed through electrodes 92, thereby generating heat that is conducted into the matrix material. In another example, in response to the cracking, breaking, or rupturing of fiber optics 94, light being conducted through fiber optics 94 may leak out at the failure location and pass into the matrix material. The heat and/or light energy may be sufficient to cause the matrix material to soften and/or liquify temporarily. Thereafter, the heat and/or light energy may be terminated, allowing the matrix material to re-harden and solidify. By this method, the failure (e.g., the deformation or crack) in the matrix material may be healed. It is contemplated that this process may be implemented more than once (e.g., via multi-phase healing), if desired. For example, different sources of heat and/or light may be selectively activated at different times and/or to different degrees, such that repairs may be made multiple times at the same locations.

The healing matrix of the FIG. 3 embodiment may include polymer networks having cross-linking strands that undergo reversible rearrangement when exposed to the heat and/or light described above. For example, the healing matrix may include Triazolinedione, a covalent-adaptable network, a spatioselective reversible resin, etc. When softened and/or liquified, the matrix material may flow to a lower-pressure area within structure 12 (e.g., into the failed area), causing a relaxation of any existing stress. Thereafter, the material may harden and shore up the failed area.

INDUSTRIAL APPLICABILITY

The disclosed system and print head may be used to continuously manufacture composite structures having any desired cross-sectional size, shape, length, density, and/or strength. The composite structures may be fabricated from any number of different reinforcements of the same or different types, diameters, shapes, configurations, and consists, each coated with a variety of matrixes. In addition, the fabrication method and composite material may allow for in-situ repairs to be automatically made to the structure as soon as damage occurs. Operation of system 10 will now be described in detail.

At a start of a manufacturing event, information regarding a desired structure 12 may be loaded into system 10 (e.g., into controller 28 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing the reinforcements down through matrix reservoir 22, and then threading the reinforcements through nozzle 18. Installation of the matrix may include filling reservoir 22 within head 16 and/or coupling of an extruder or external bath (not shown) to head 16. Head 16 may then be moved by support 14 under the regulation of controller 28 to cause matrix-coated reinforcements to be placed against or on a corresponding stationary anchor point 20. Cure enhancers 26 within head 16 may then be selectively activated to cause hardening of the matrix surrounding the reinforcements, thereby bonding the reinforcements to anchor point 20.

The component information may then be used to control operation of system 10. For example, the reinforcements may be pulled and/or pushed from nozzle 18 (along with the matrix), while support 14 selectively moves head 16 in a desired manner during curing, such that an axis of the resulting structure 12 follows a desired trajectory (e.g., a free-space, unsupported, 3-D trajectory). Once structure 12 has grown to a desired size and/or length, structure 12 may be disconnected (e.g., severed) from head 16 in any desired manner.

As described above, some or all of the reinforcements printed into structure 12 may be at least partially filled or otherwise coated with a healing matrix $M_H$. When damage of structure 12 occurs, the healing matrix $M_H$ may be activated to shore up the damage site. For example, different parts of the healing matrix $M_H$ may flow around the damaged reinforcements, be mixed together and/or exposed to a cure energy, and then harden in place. When this occurs, the healing matrix $M_H$ becomes the structure matrix $M_S$, binding the reinforcements to each other.

It will be apparent to those skilled in the art that various modifications and variations can be made to the disclosed system, method, material, and print head. Other embodiments will be apparent to those skilled in the art from consideration of the specification and practice of the disclosed system, method, material, and print head. It is intended that the specification and examples be considered as exemplary only, with a true scope being indicated by the following claims and their equivalents.

What is claimed is:

1. An additively manufactured structure, comprising:
a structural reinforcement;
a healing reinforcement that is different from the structural reinforcement; and
a healing matrix at least partially filling the healing reinforcement, wherein:
a cure energy applied at a time of failure causes the healing matrix to cure and shore up the structural reinforcement;
the healing matrix includes a base resin and a catalyst; and
at least one of the base resin and the catalyst is provided in a capsule that ruptures at the time of failure to initiate a reaction that cures the base resin.

2. The additively manufactured structure of claim 1, wherein the healing reinforcement is one of a wire and a fiber optic.

3. The additively manufactured structure of claim 1, wherein the healing matrix is one of a Triazolinedione, a covalent-adaptable network, and a spatioselective reversible resin.

4. The additively manufactured structure of claim 1, wherein the healing matrix at least partially coats the structural reinforcement at a time of failure.

5. The additively manufactured structure of claim 1, wherein the healing matrix at least partially fills the healing reinforcement.

6. The additively manufactured structure of claim 5, wherein the healing matrix breaches the healing reinforcement at the time of failure.

7. The additively manufactured structure of claim 1, wherein each of the base resin and the catalyst are provided within separate capsules that rupture at the time of failure.

8. The additively manufactured structure of claim 1, wherein the at least one of the base resin and the catalyst provided in the capsule is distributed within a bath of the other of the base resin and the catalyst at a ratio specified for curing of the bath.

9. An additively manufactured structure, comprising:
at least one continuous reinforcement; and
a healing matrix at least partially filling the at least one continuous reinforcement, wherein the healing matrix breaches from the at least one continuous reinforcement at a time of failure, at least partially coats the at least one continuous reinforcement, and cures,
wherein:
the healing matrix includes a base resin and a catalyst; and
at least one of the base resin and the catalyst is provided in a capsule that ruptures at the time of failure to initiate a reaction that cures the base resin.

10. The additively manufactured structure of claim 9, wherein the at least one continuous reinforcement includes:
a solid structural reinforcement; and
a hollow healing reinforcement that receives the healing matrix.

11. The additively manufactured structure of claim 10, wherein the hollow healing reinforcement is at least one of more brittle and smaller than the solid structural reinforcement.

12. The additively manufactured structure of claim 10, wherein:
the solid structural reinforcement is at least partially coated with at least one of the base resin and the catalyst at a time of failure; and
the other of the base resin and the catalyst breaches the capsule at the time of failure to initiate a reaction that cures the base resin.

13. The additively manufactured structure of claim 9, wherein the healing matrix is pressurized during operational use of the additively manufactured structure.

14. The additively manufactured structure of claim 9, wherein each of the base resin and the catalyst are provided within separate capsules that rupture at the time of failure.

15. The additively manufactured structure of claim 9, wherein the at least one of the base resin and the catalyst provided in the capsule is distributed within a bath of the other of the base resin and the catalyst at a ratio specified for curing of the bath.

16. An additively manufactured structure, comprising:
a structural reinforcement;
a healing reinforcement containing a liquid healing matrix; and
a structural matrix at least partially coating the structural and healing reinforcements, the structural matrix being cured,
wherein the liquid healing matrix includes a base resin and a catalyst, at least one of which is contained within capsules inside the healing reinforcement.

17. The additively manufactured structure of claim 16, wherein:
the liquid healing matrix is curable when exposed to environmental conditions; and
the healing reinforcement is more brittle than the structural reinforcement.

18. The additively manufactured structure of claim 16, wherein each of the base resin and the catalyst are provided within separate capsules that rupture at the time of failure.

19. The additively manufactured structure of claim 16, wherein the at least one of the base resin and the catalyst provided in the capsule is distributed within a bath of the other of the base resin and the catalyst at a ratio specified for curing of the bath.

\* \* \* \* \*